No. 656,962. Patented Aug. 28, 1900.
C. D. P. GIBSON.
MOTOR VEHICLE.
(Application filed Feb. 8, 1897.)
(No Model.) 8 Sheets—Sheet 3.
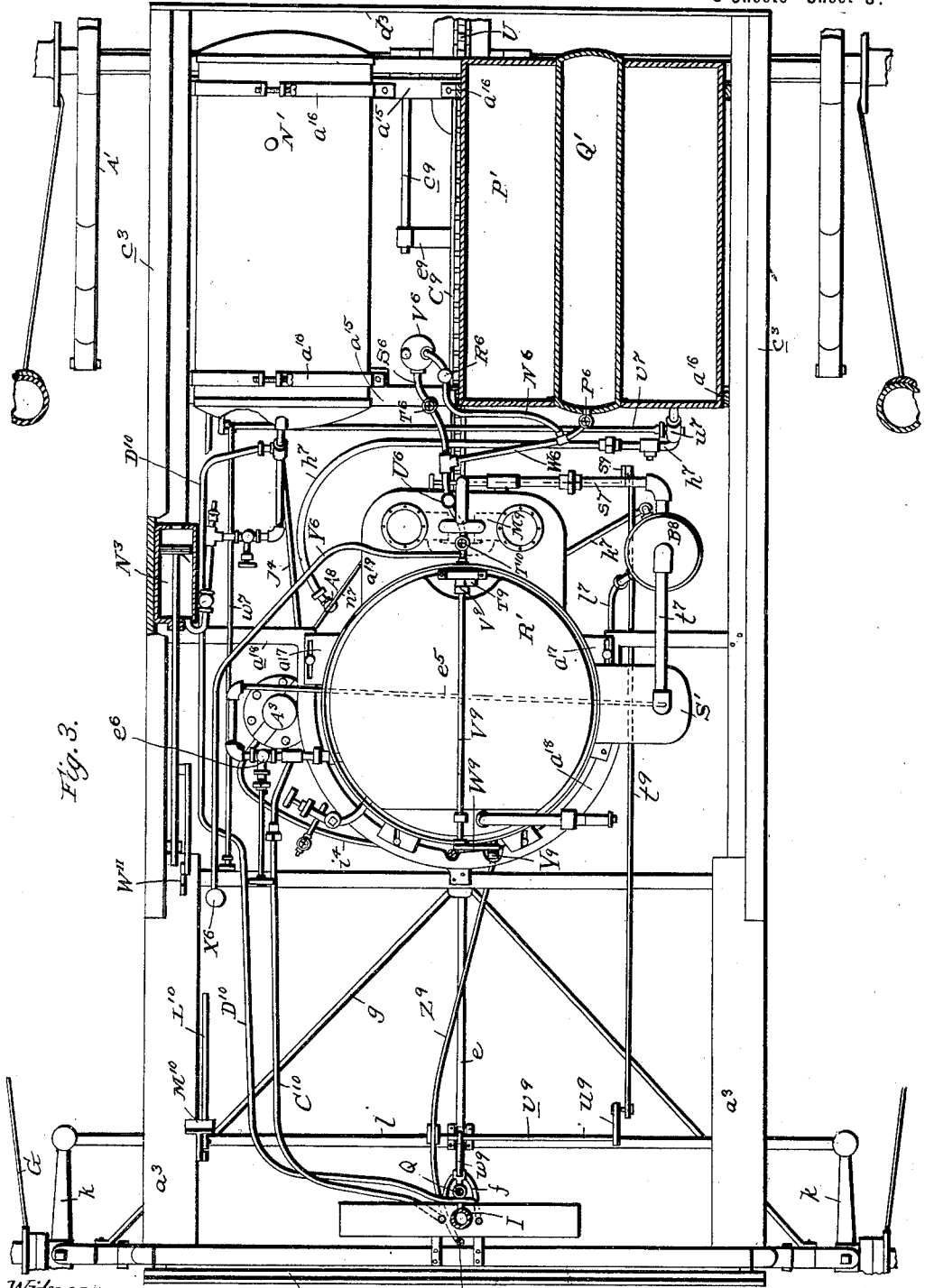

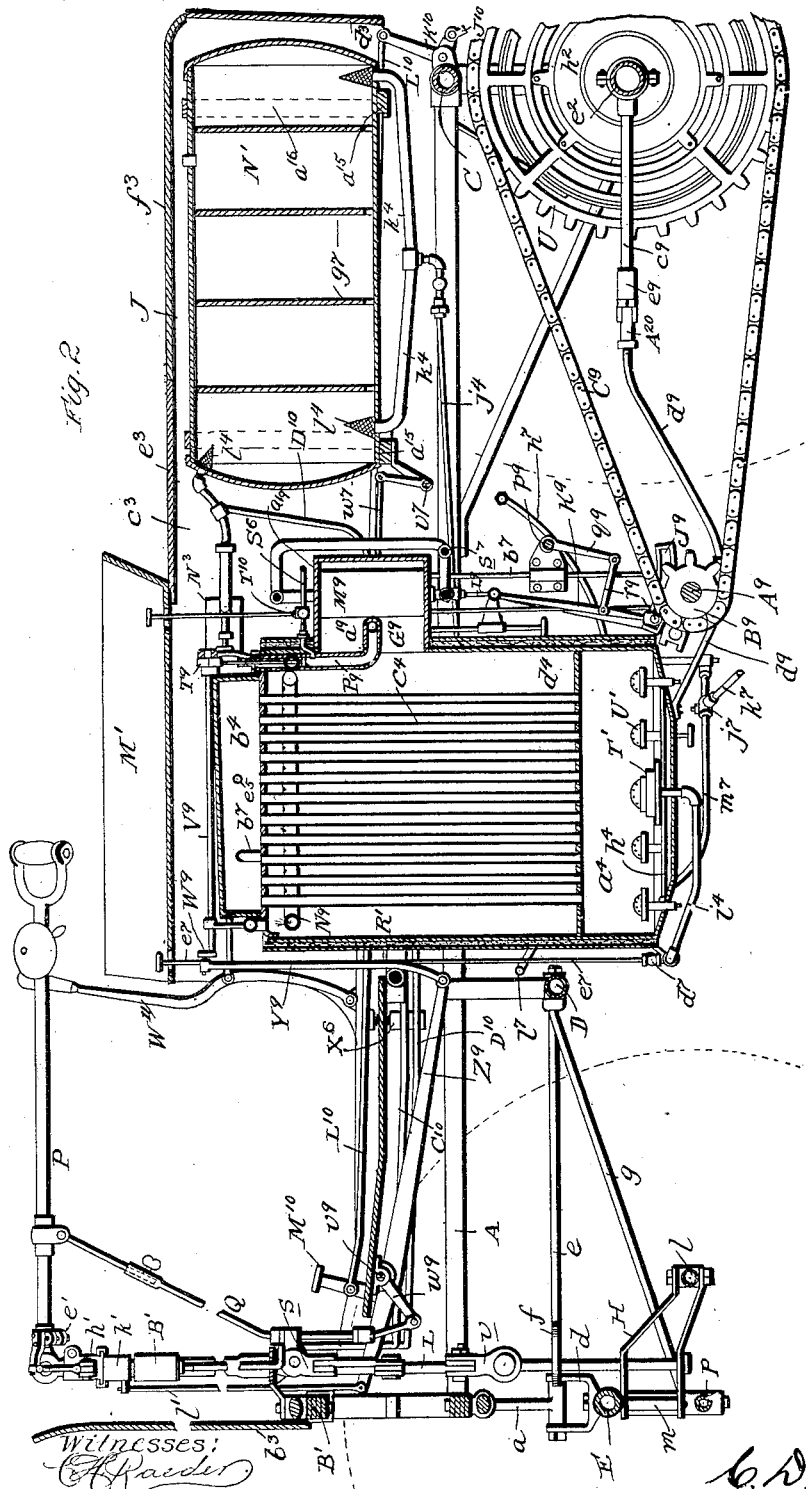

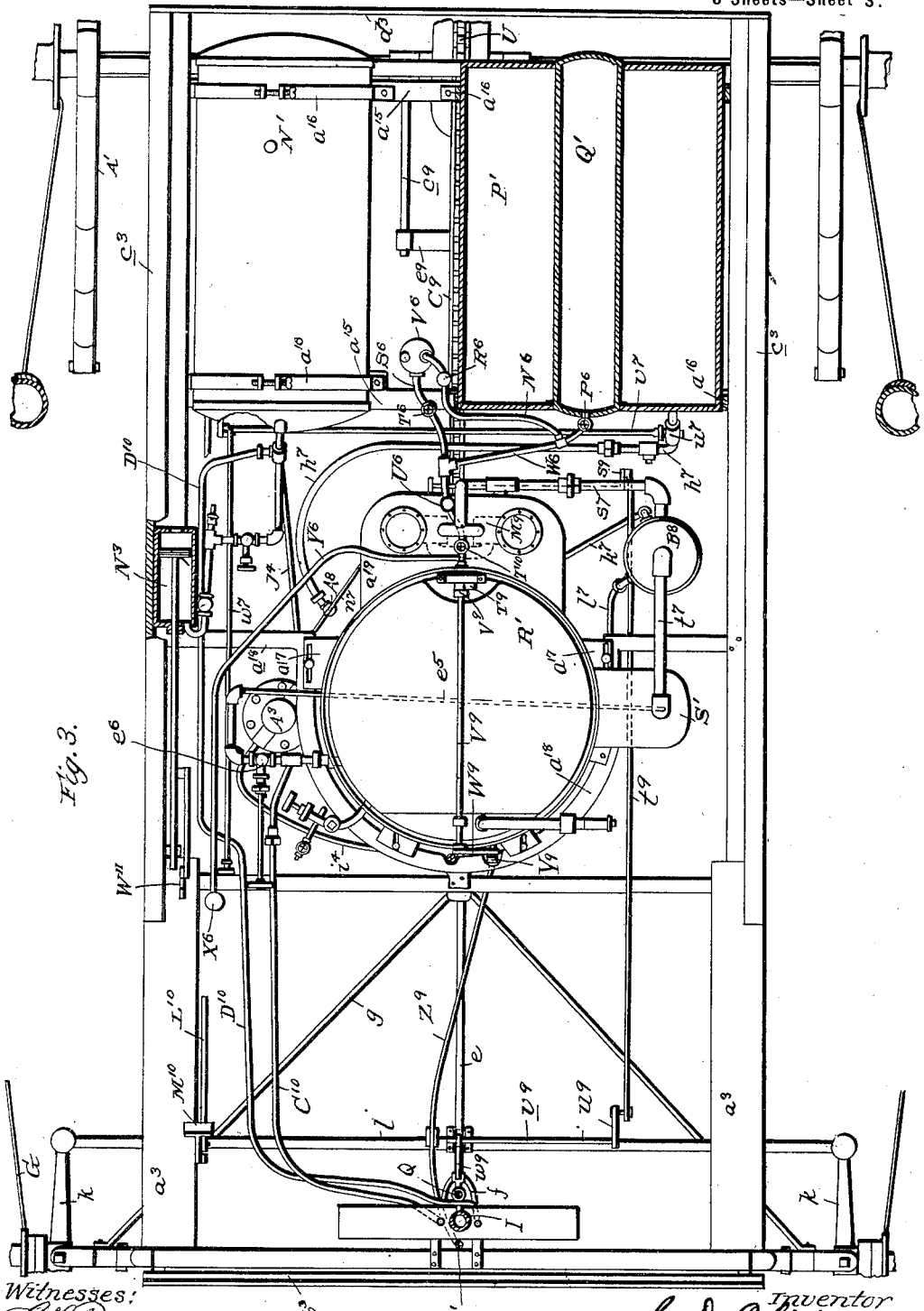

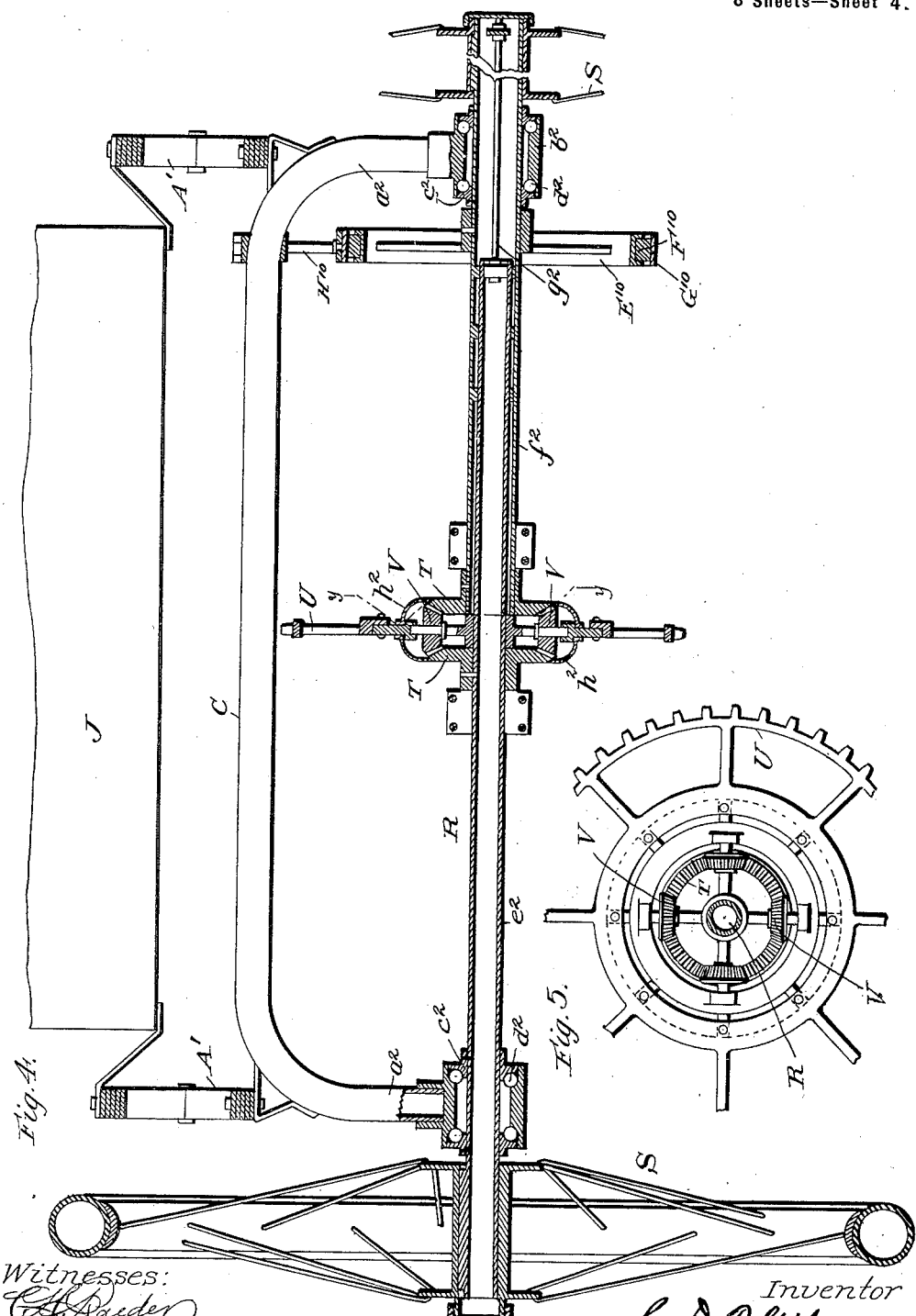

No. 656,962. Patented Aug. 28, 1900.
C. D. P. GIBSON.
MOTOR VEHICLE.
(Application filed Feb. 8, 1897.)
(No Model.) 8 Sheets—Sheet 5.
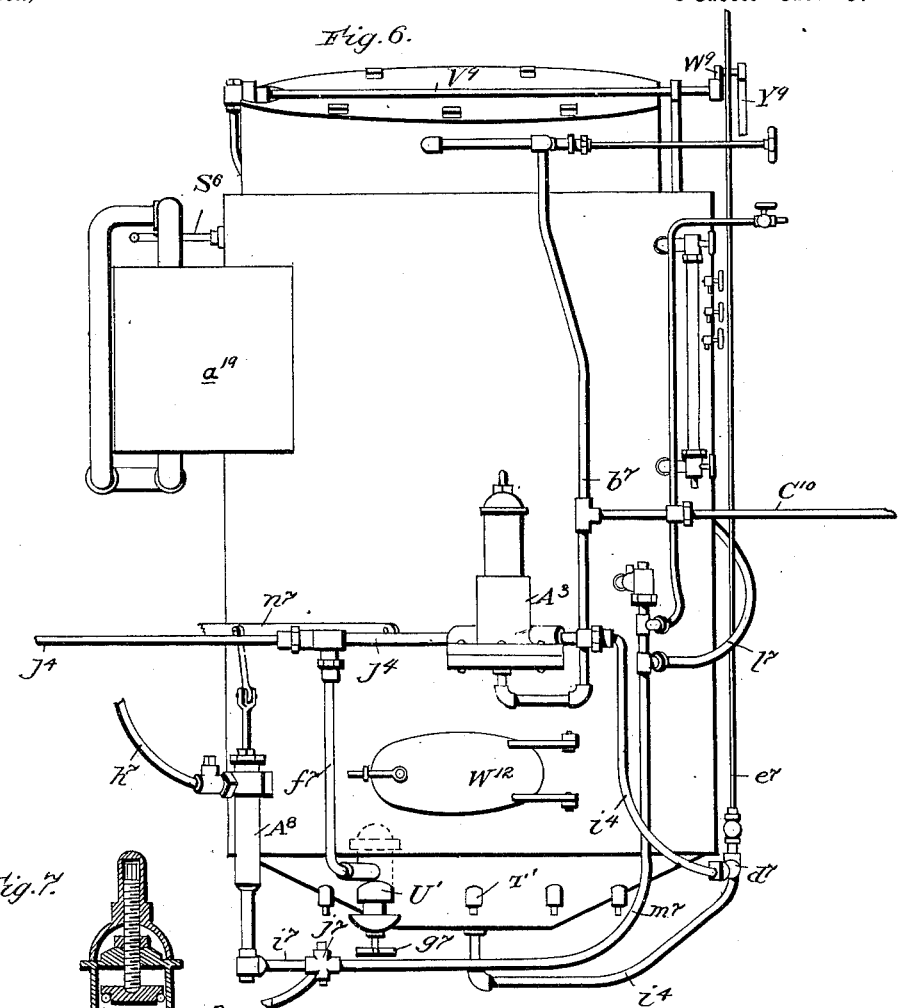
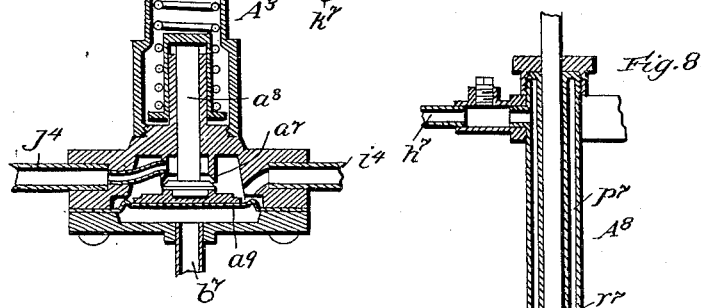
Witnesses:
Inventor
C. D. P. Gibson
By James J. Sheehy
Attorney
THE NORRIS PETERS CO., PHOTO-LITHO., WASHINGTON, D. C.

No. 656,962. Patented Aug. 28, 1900.
C. D. P. GIBSON.
MOTOR VEHICLE.
(Application filed Feb. 8, 1897.)
(No Model.) 8 Sheets—Sheet 6.
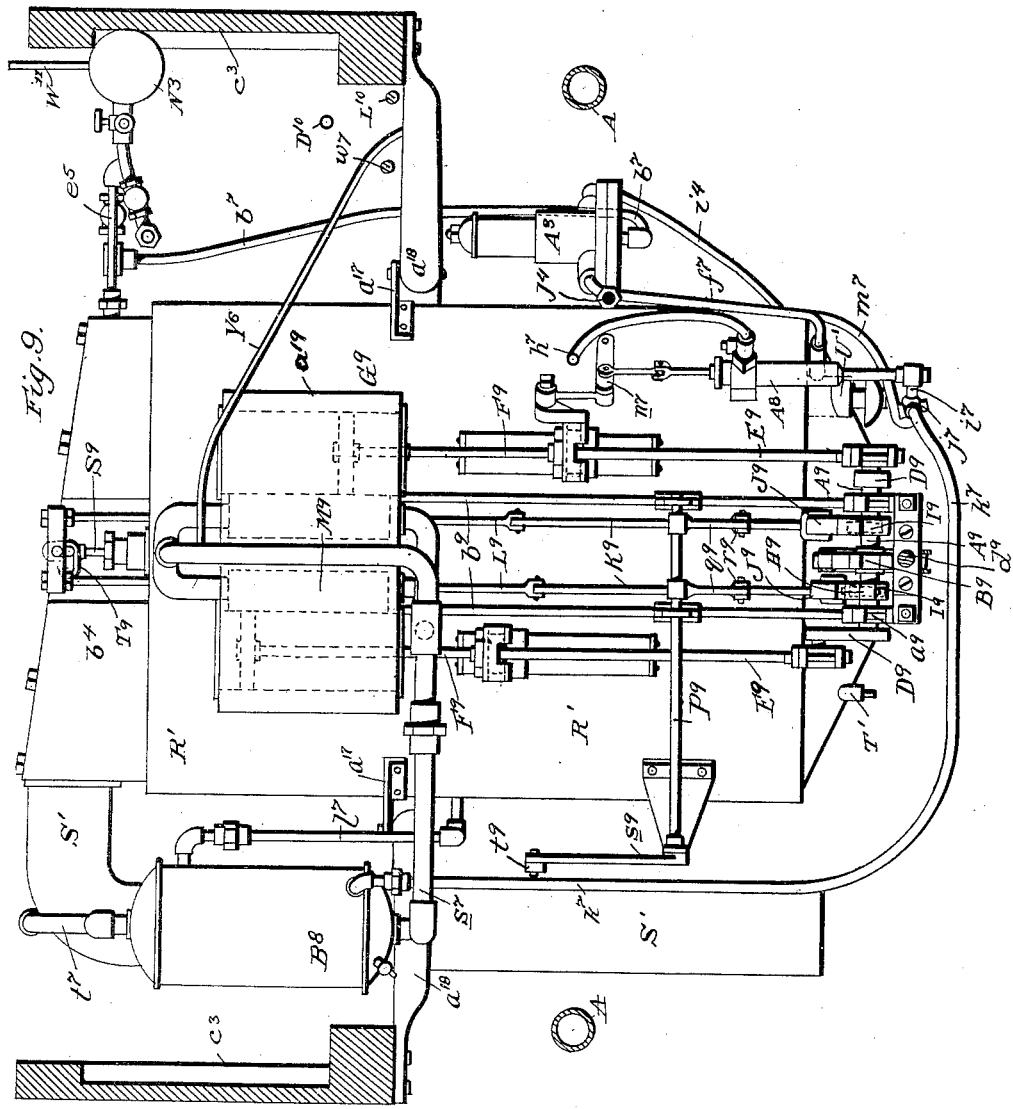

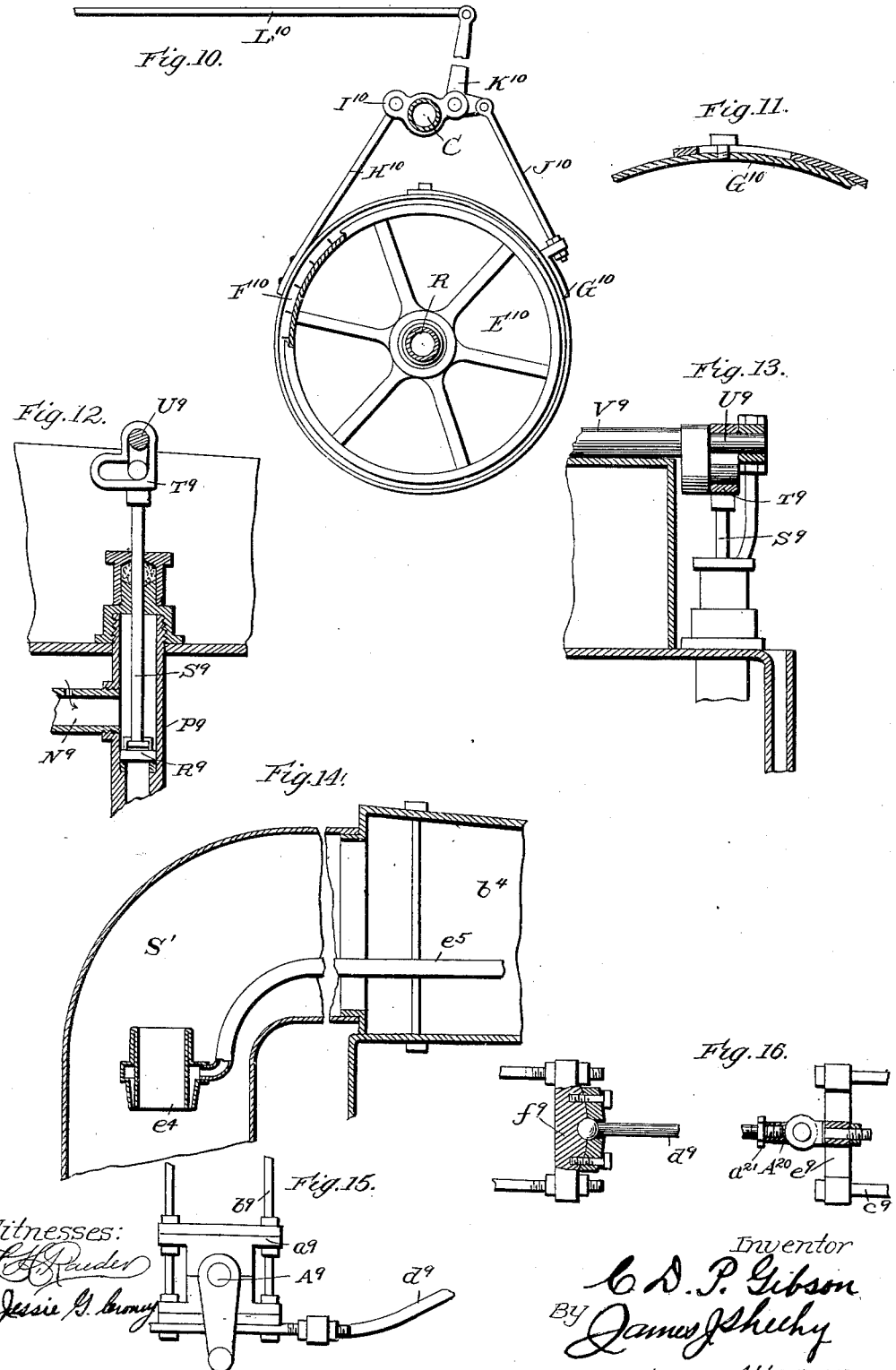

No. 656,962. Patented Aug. 28, 1900.
C. D. P. GIBSON.
MOTOR VEHICLE.
(Application filed Feb. 8, 1897.)
(No Model.) 8 Sheets—Sheet 8.
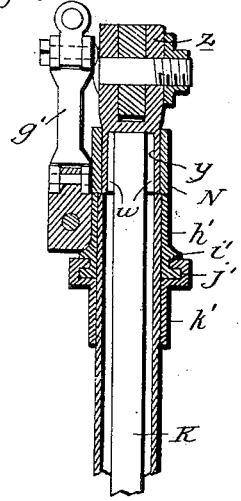
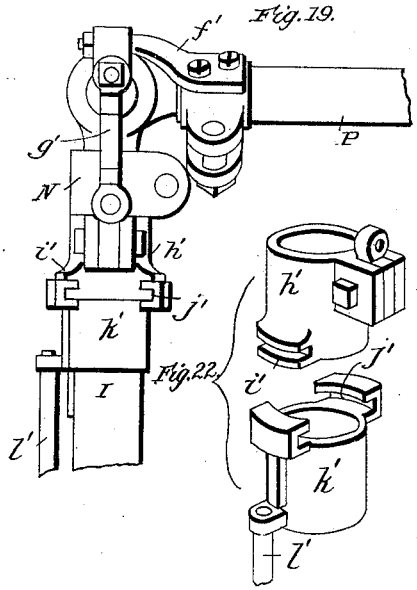
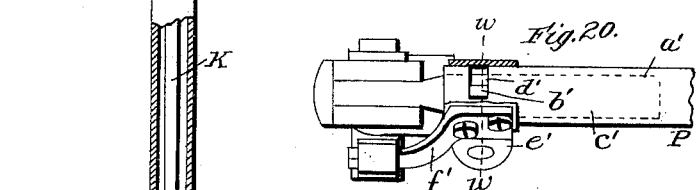
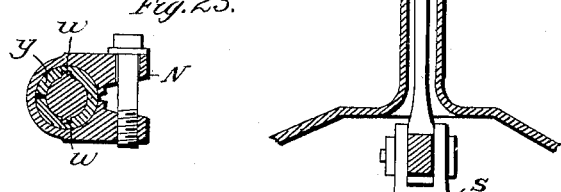
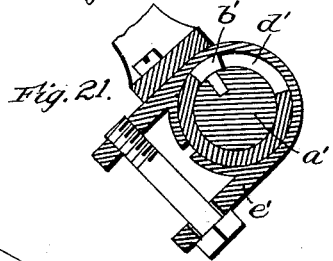
Witnesses:
Inventor
C. D. P. Gibson
By James J. Sheehy
Attorney

UNITED STATES PATENT OFFICE.

CHARLES DAVID PAIGE GIBSON, OF JERSEY CITY, NEW JERSEY.

MOTOR-VEHICLE.

SPECIFICATION forming part of Letters Patent No. 656,962, dated August 28, 1900.

Application filed February 8, 1897. Serial No. 622,571. (No model.)

*To all whom it may concern:*

Be it known that I, CHARLES DAVID PAIGE GIBSON, a citizen of the United States, residing at Jersey City, in the county of Hudson and State of New Jersey, have invented certain new and useful Improvements in Motor-Vehicles; and I do declare the following to be a full, clear, and exact description of the invention, such as will enable others skilled in the art to which it appertains to make and use the same.

My invention relates to that class of vehicles which are propelled by motors and are known as motor-vehicles; and it contemplates improving the same by providing a single handle through the medium of which the vehicle may be steered and the propelling motor or mechanism started, stopped, and reversed; by providing a device intermediate of the handle and the pilot wheel or wheels which will compensate for the vertical movements of a spring-supported body and thereby prevent movement of the handle-support with respect to said body; by providing a connection between the forward axletree or frame and the main frame which will permit of the axletree assuming an inclined position, as when one of its wheels passes over a stone or along a hillside or embankment, while the main frame and body and the parts carried thereby remain in a horizontal position; by providing short journals for the pilot-wheels and pivotally connecting said journals to the ends of the axletree or frame and connecting them with the steering-handle, so that said wheels may be easily swung in one direction or the other on the axletree to afford a free passage for persons entering or leaving the vehicle and also to render easy the steering of the vehicle when in motion, and particularly in making short turns; by providing a sectional rear axle or shaft and connecting said sections and applying power thereto in such a manner that in turning a corner or making a sharp turn the rear wheel which is at the side toward which the vehicle is to be turned will automatically cease to rotate, so as to facilitate the making of the turn and will again be rotated in a forward direction at the end of the turn; by providing a downward discharge for the heat and particles of combustion of the steam-generator of the motor or propelling mechanism and arranging a steam or gas jet in said discharge for use when a forced draft is desired; by providing in the fire-box of the steam-generator one or more hydrocarbon-burners and a "hydrocarbon-torch," the said burners and torch being connected with a source of fuel-supply in such a manner that the supply of fuel to the burners may be cut off without cutting off the supply to the torch, so that when a stop is made the burners may be extinguished by cutting off their supply of fuel and a saving in fuel thus effected, and when it is desired to start up again the burners will be lighted by the torch when the fuel is supplied to said burners; by providing a reservoir for gasolene or other hydrocarbon fuel and a pump for compressing air in said tank, such compressed air being designed to act on the surface of the hydrocarbon to force the same out of the tank; by providing an engine, a steam-generator, a tank containing carbonic-acid gas, and connections whereby the engine may be actuated by steam, by steam and carbonic-acid gas, or by carbonic-acid gas alone, as desired; by providing a fluid-pressure governor-valve for controlling the flow of hydrocarbon fuel to the burners, and by so arranging and constructing the several parts that the vehicle possesses the requisite strength and yet is compact and neat in appearance and is not unduly heavy.

Other objects and advantages of the invention will be fully understood from the following description and claims when taken in conjunction with the annexed drawings, in which—

Figure 1 is a perspective view of the forward portion of my improved vehicle with some of the parts in section and other parts broken away. Fig. 2 is a vertical longitudinal section of the vehicle. Fig. 3 is a plan view with some of the parts in section. Fig. 4 is an enlarged detail section taken through the rear axle or drive-shaft. Fig. 5 is a detail section taken in the plane indicated by the line *y y* of Fig. 4. Fig. 6 is an enlarged side elevation of the steam-generator and its appurtenances. Fig. 7 is an enlarged sectional view of the steam-actuated or fluid-pressure governor for controlling the fuel-supply of the burners. Fig. 8 is a similar view of the pump for forcing water from the reservoir into the boiler. Fig. 9 is an enlarged transverse section taken in the plane indicated by the line $xx$ of Fig. 3. Fig. 10 is a detail elevation, partly in section, illustrating the brake. Fig. 11 is an enlarged detail section of the brake-band. Fig. 12 is a detail section illustration of the throttle-valve. Fig. 13 is a detail section, with parts in elevation, taken in a plane at right angles to Fig. 12. Fig. 14 is a detail section of the downtake for smoke and particles of combustion with the steam-jet in position therein. Fig. 15 is a detail side elevation of one of the bearing-boxes of the crank-shaft of the engine and the brace connected thereto. Fig. 16 is a broken plan view of said brace with parts in section. Fig. 17 is a detail enlarged view, partly in elevation and partly in section, illustrating the tubular post and the steering and motor-controlling devices thereon, together with the devices for compensating for vertical movements of the body and main frame. Fig. 18 is an enlarged diametrical section illustrating the upper portion of the tubular post and the parts thereon. Fig. 19 is a detail elevation taken in a plane at right angles to Fig. 18. Fig. 20 is a plan view of the construction shown in Fig. 19. Fig. 21 is an enlarged transverse section taken in the plane indicated by the line $w\ w$ of Fig. 20. Fig. 22 comprises separated perspective views of the sections of the slidable sleeve of the tubular post, and Fig. 23 is a detail section taken in the plane indicated by the dotted line $y\ y$ of Fig. 17.

In the said drawings similar letters of reference designate corresponding parts in all of the several views, referring to which—

A indicates the side-bars, B C the front and rear cross-bars, and D the intermediate cross-bar, of the main frame of the vehicle, which for the sake of lightness and strength is preferably formed of steel tubing.

The front frame-bar B (see Fig. 1) is provided at its middle with the depending arm $a$, which terminates at its lower end in a longitudinally-disposed sleeve $b$ and is pivotally connected by a bolt $c$, extending through said sleeve $b$ to a yoke $d$ at the middle of the axletree E, as shown, whereby it will be seen that the axletree may assume an inclined position, as when one of its wheels passes over a stone or obstruction or along a hillside or embankment, without inclining the main frame of the vehicle, which is an important advantage.

The intermediate cross-bar D of the main frame is pitched downwardly from the side-bars A to the longitudinal center of the vehicle, and it is connected by the brace-bar $e$, which has the loop $f$, with the sleeve $b$. The brace-bar $e$ in turn is connected with the axletree E by braces $g$, the said braces being fixedly connected at their forward ends to the axletree and connected at their rear ends to the brace-bar $e$ at a point adjacent to the frame-bar D, so as not to interfere with the axletree rocking with respect to the main frame, in the manner and for the purpose before described. This arrangement provides the axletree E with an axis horizontally and longitudinally arranged relatively to the body of the vehicle, upon which axis the axletree is free to swing in a vertical plane without any cramping action, as the bearings of the axis at the ends of the brace-bar $e$ are widely distributed, said axletree being firmly held in its transverse relation to the main frame and body of the vehicle by the braces $g\ g$, which are connected to the axletree near its ends and angularly extend to the rear end of the brace-bar $e$ and upon which said braces rock and constitute the rear bearing of the horizontal axis of the axletree E.

The axletree E, which is held against swinging in a horizontal plane by the devices just described, is provided at its ends with yokes $i$, in the horizontal arms of which are journaled the T-heads $j$ of the journals F, on which the front or steering wheels G are mounted. These journals F are provided with rearwardly-extending arms $k$, and said arms are connected by a cross-rod $l$, which in turn is pivotally connected at its middle to an arm H, comprising two members connected at their forward ends by a pin $m$ and having said ends arranged between the two bars $n\ p$ of the axletree E, as shown. The arm H is fixed on a rod M, whereby it will be observed that when the rod M is rocked and the arm H is swung in a horizontal plane the journals F will be swung in a corresponding direction and the wheels G with them, and when the vehicle is in motion its direction of movement will be changed. The journals F and wheels G may be quickly swung in the manner described with but a minimum amount of effort on the part of the operator, and they enable the vehicle to make a very short turn, which is an important advantage, as it permits of the use of the vehicle in narrow and crowded streets. The wheels G, mounted in the manner described, are also advantageous, because they may be readily swung into such positions as to enable a person to enter or leave the vehicle without soiling the clothes on either one of them, and the journals $j$ being so arranged as to intersect the center of the wheels said wheels will not be liable to be casually turned by obstructions and uneven places in a roadway.

I indicates a tubular post which is fixedly connected with and rises from the footboard $r$ of the body J, presently described. Through this tubular post I extends a rock-shaft K, which has its lower end connected by a link $s$ with the upper ends of the upper members $t$ of a "diamond" L. This diamond consists of four members or bars pivoted together at their ends and arranged in a vertical plane, the pivotal connection of the link $s$ to the shaft K being at right angles to its pivotal connection with the joint of the upper members $t$ of the diamond, and the joint of the lower members $u$ of the diamond is by the link $v$ connected to the upper end of the rod M, which is fixedly connected to the swinging arm H, as illustrated. The link $v$ is similar in construction to the link $s$ and has right-angled pivotal connections with the diamond and the rod M. From this it will be observed that when the shaft K is rocked or turned on its axis the rod M will be correspondingly moved through the medium of the links $s$ and $v$ and the diamond L, and the arm H and wheels G will be swung in a corresponding direction. This construction and arrangement of these parts in conjunction with the horizontal axis of the axletree E insures a positive action and universal connection between the steering-shaft K and the wheels G in whatever direction the alinement of the shaft K and the rod M may be disturbed and for all positions assumed by the axletree E in swinging in a vertical plane on its horizontal axis. At its upper end the rock-shaft K is provided with one or more splines $w$, (see Fig. 23,) which engage with corresponding grooves in a split socket $y$, forming part of a bifurcated head $z$, which is designed to turn with the rock-shaft and is secured upon said shaft by a clamp N, which encompasses the split socket $y$, so as to serve the additional function of securing the rock-shaft against vertical movement in the tubular post.

P indicates a handle which is arranged in the bifurcation of the head $z$ and is pivotally connected thereto, so as to permit of it being swung in a vertical plane on said head. This handle P is better shown in Figs. 20 and 21, and it comprises a male member $a'$, which is connected to the head $z$ and has a lug $b'$ at an intermediate point of its length, and a female member $c'$, which receives the male member and has a slot $d'$, in which is arranged the lug $b'$ of the male member, so as to permit of the female member being turned on the male member for a purpose presently described. The female handle member $c'$ is encompassed by a clamp $e'$, which serves to cover the slot $d'$ thereof and also serves for the connection of a forwardly-extending arm $f'$. This arm $f'$ is connected by a link $g'$ with a sleeve-section $h'$, (see Fig. 22,) which is loosely mounted on the post I and is provided with the circumferential ribs $i'$, designed to rest and move in the grooves $j'$ at the upper end of the sleeve-section $k'$, which is designed to be connected by a rod $l'$ and other intermediate connections, presently described, with the throttle-valve of the motor to actuate the same. The lower sleeve-section $k'$ is held by the rod $l'$ against any but a vertical reciprocating movement on the post I; but the upper sleeve-section $h'$ is free to move vertically and is also, by reason of its peculiar connection to the sleeve-section $k'$, free to turn on the post I in concert with the movements of the handle P in a horizontal plane necessary to steer the vehicle.

The female member $c'$ of the handle P is loosely arranged at an intermediate point of its length in a sleeve $m'$, which is pivotally connected to the upper end of a reciprocatory rod Q, which is designed with other devices presently described to connect the handle P with the valve-gear of the engine, so that when said handle is moved upwardly in a vertical plane the engine and the direction of movement of the vehicle will be reversed. The said rod Q is preferably formed by two adjustably-connected sections, as better shown in Fig. 1, so that the handle P may be normally held at an elevation best suited to the operator.

From the foregoing it will be observed that the handle P is capable of movement in both a horizontal plane and a vertical plane and that it is also capable of being rocked, and it will also be observed that the parts are so constructed and arranged and the connections are such that the handle is adapted to be adjusted to perform any one of its functions regardless of its position. For instance, the said handle is adapted to be swung to the right or left in a horizontal plane to move the wheels G and steer the vehicle and when in either of said positions or when in the longitudinal center of the vehicle is adapted to be turned or rocked to close or open the throttle-valve and is also adapted to be raised to reverse the engine and cause the vehicle to move backward or lowered to cause the vehicle to resume its forward movement. In other words, the operator grasping the handle P with one hand is enabled with such single hand to steer the vehicle, stop and start the engine, and also reverse the engine, as well as to cause it to resume the motion which drives the vehicle forwardly.

The rear cross-bar C of the main frame A (see Figs. 4 and 5) terminates at its ends in the depending hanger-arms $a^2$, which are provided with bearing-boxes $b^2$ for the reception of the drive-shaft or axle R, the said shaft or axle being provided with cones $c^2$, between which and the boxes $b^2$ balls $d^2$ are interposed, as shown, so as to reduce the friction to a minimum. The shaft or axle R is preferably formed of steel tubing, and it comprises a section $e^2$ and a section $f^2$, which loosely receives the section $e^2$ and is connected thereto in a swiveled manner by a bolt $g^2$, so as to permit the sections to rotate independent of each other. Each of the sections $e^2 f^2$ is provided at its outer end with a fixedly-mounted wheel S, and they are also provided adjacent to the middle of the shaft or axle with the fixedly-mounted beveled gears T. Arranged between these beveled gears T and loosely mounted on the sections $e^2$ is a sprocket-wheel U, which carries four (more or less) loosely-mounted beveled pinions V, in mesh with the teeth of the gear-wheels T, and also carries an annular cap $h^2$, the purpose of which is to exclude dust and dirt from the gearing. The sprocket-wheel U is designed to be rotated by means, presently described, to drive the vehicle, and when the vehicle is moving in a straight or approximately-straight line it will be observed that the pinions V of the sprocket-wheel will not rotate, but engaging the teeth of the gear-wheels T will transmit the rotary motion of the sprocket-wheel to said gear-wheels, and consequently to the shaft-sections $e^2 f^2$ and the wheels S thereon. When, however, the vehicle is making a turn, the wheel S on the side toward which the vehicle is turning will remain stationary, together with its shaft-section and the gear thereon, while the sprocket-wheel, through the medium of its pinions V, will continue to rotate the gear on the other section, together with said section and the wheel thereon. This, as will be readily appreciated, will enable the vehicle to make a very short turn, which is an important advantage, especially when the vehicle is to be used in the streets of cities.

The body J of the vehicle is mounted upon and connected to the springs A' B' on the main frame and may be of any suitable form and construction. I prefer, however, to have the said body comprise the side beams $a^3$, which carry the dashboard $b^3$ at their forward ends and have the footboard $r$ connected to them, the side walls or skirts $c^3$, which are connected to and rise from the beams $a^3$, the rear transverse wall $d^3$, and the top wall $e^3$, which has its forward portion adapted to form a seat M' and also has a door $f^3$ to permit of ready filling of the gasolene-tank, presently described. The said body J carries at its rear end the tank N' for gasolene or other hydrocarbon fuel, and it also carries the water-tank P', which is preferably arranged at the side of the gasolene-tank, and the carbonic-acid-gas "cartridge" Q', which for the sake of economizing space is arranged within the water-tank, as shown, said tanks N' and P' being connected to cross-bars $a^{15}$ of the body by a clamp-strap $a^{16}$ for a purpose presently described. In front of the gasolene-tank N' and the water-tank P' and at about the center of the vehicle is arranged the steam-generator R', which is provided with slotted flanges $a^{17}$, adjustably connected to a yoke $a^{18}$ on the body, as shown, for a purpose presently described. This generator R' may be of any construction suitable to the purpose of my invention; but I prefer to have it comprise the fire-box $a^4$, the smoke-box $b^4$, and the fire-tubes $c^4$, which connect the fire and smoke boxes and extend through the steam-chamber $d^4$, as shown. Adjacent to its upper end the generator R' is provided with the discharge-pipe S' for smoke and particles of combustion, which pipe extends laterally from the generator a slight distance and thence downwardly to a point adjacent to the ground, as better shown in Fig. 9, so as to discharge the smoke and particles of combustion downwardly in such a manner as to make but a minimum amount of noise, attract but little attention, and prevent the smoke and heat from annoying the operator, which is an important advantage. In the upper portion of the smoke-pipe or downtake S' is arranged an annular jet $e^4$, which is connected by a pipe $e^5$ with the steam-chamber $d^4$, the said pipe $e^5$ extending through the smoke-box of the generator, as shown by dotted lines in Fig. 3, and being provided with the valve $e^6$, as shown, through the medium of which the operator may control the passage of steam or gas to the smoke-pipe, and consequently the amount of draft.

T' indicates a plurality of hydrocarbon-burners of suitable construction, which are arranged in the fire-box $a^4$ at the steam-generator, and U' indicates what I term a "torch," but which may be similar in construction to the burners T'. The several burners T' are connected by a common pipe $h^4$, (see Figs. 2 and 6,) and to this pipe $h^4$ is connected the oil-supply pipe $i^4$, which is connected by the governor $A^3$ (see Fig. 7) with the pipe $j^4$, which in turn is connected to the middle of a pipe $k^4$. (See Fig. 2.) This pipe $k^4$ communicates at its ends with the interior of the gasolene-tank N' at opposite ends thereof, and it is provided with strainers $l^4$ and is inclined downwardly from the tank to the point at which it joins the pipe $j^4$, whereby it will be seen that when the supply of gasolene in the tank is low and the vehicle is traveling down a sharp grade the fuel will freely flow through the forward portion of the pipe $k^4$ to the pipe $j^4$, while when the vehicle is traveling upgrade the fuel will flow to the pipe $j^4$ through the rear portion of pipe $k^4$, thus insuring a constant supply to the burners T'.

The gasolene-tank N' is divided by a plurality of transverse partitions $g^7$ into several compartments connected by apertures through said partitions adjacent to the bottom of the tank, and consequently it will be seen that the motion of the vehicle and inclination of the same will be prevented from causing the gasolene to rapidly collect in one part of the tank and will insure the ends of the pipe $k^4$ being always covered with gasolene. Said tank N' is connected by a strainer-capped pipe, as better shown in Fig. 3, with an air-compressing pump $N^3$, which is designed to be operated by hand through the medium of lever $W^{11}$ and has for its function to charge the tank with air under pressure, such compressed air being designed to act on the surface of the hydrocarbon to force the same out of the tank.

The governor $A^3$, which controls communication between the pipes $j^4$ $i^4$, and consequently the flow of the fuel to the burners T', is provided with the valve-seat $a^7$, the spring-backed valve $a^8$, and the diaphragm $a^9$, connected to the valve, and it is connected with the steam-chamber $d^4$ of the generator R' by a pipe $b^7$ and the pipe $e^5$, whereby it will be seen that when the steam in the generator exceeds a certain pressure it will, by acting against the diaphragm $a^9$, close the valve $a^8$ and shut off the supply of oil to the burners T' until the pressure is reduced to a certain extent, when the valve will be automatically opened by the spring backing the same and the supply of fuel to the burners reëstablished. The pipe $i^4$ is preferably provided with a valve $d^7$, which has its stem $e^7$ extending above the seat M', as shown in Figs. 2 and 6, so that the operator may conveniently shut off the supply of fuel to the burners T' when the vehicle is stopped for any length of time. The torch U' is connected by a pipe $f^7$ with the pipe $j^4$ at a point between the governor $A^3$ and the pipe $k^4$, and consequently it will be seen that the supply of hydrocarbon fuel to the torch will be continuous and not subject to the action of the governor $A^3$ or controlled by the valve $d^7$. In virtue of this the torch U' will burn continuously and will serve to ignite the several burners T' when the supply of fuel to the same is resumed. Said torch U' is, however, provided with a hand-operated valve $g^7$, (see Fig. 6,) through the medium of which the supply of fuel to the torch may be regulated to prevent waste or shut off when the vehicle is not in use.

Water is conducted from the tank P' to the steam or water chamber $d^4$ of the steam-generator R' through the pipe $h^7$, (see Figs. 3, 6, and 9,) the pump $A^8$, the pipe $i^7$, the cock $j^7$, the pipe $k^7$, the feed-water heater $B^8$, and the pipe $l^7$, or when it is not desired to heat the water prior to its introduction into the boiler the cock $j^7$ is turned so as to cut off communication between the pipe $i^7$ and the pipe $k^7$ and establish communication between said pipe $i^7$ and the pipe $m^7$, which leads directly into the chamber $d^4$ of the generator R', as shown in Fig. 6. The pump $A^8$ for forcing the water from the tank P' to the steam-generator may be of any suitable construction, but is preferably constructed as better shown in Fig. 8. Said pump is operated by one of the piston-rods of the engine (presently described) through the medium of a lever $n^7$, (see Fig. 9,) and when its piston moves upwardly water is drawn into it through the pipe $h^7$, chamber $p^7$, and aperture $r^7$, and when said piston is moved downwardly such water is forced before it through the pipe $i^7$ and other connections before described to the feed-water heater.

The feed-water heater $B^8$ is of the ordinary construction and need not be further referred to, except to say that it is fed with exhaust-steam from the engine (presently described) through a valve-controlled pipe $s^7$ and discharges such steam through the pipe $t^7$ into the smoke-pipe S', as better shown in Fig. 9.

The passage of water from the tank P' is controlled by a valve $u^7$ in pipe $h^7$, (see Fig. 3,) which valve is fixed on a transverse shaft or stem $v^7$, having a crank at one end, to which is connected a rod $w^7$, which extends to a point convenient to the operator's seat M', so that he can readily turn on or cut off the supply of water to the steam-generator when desired.

$A^9$ indicates a shaft which has a sprocket-wheel $B^9$ connected by an endless chain $C^9$ with the large sprocket-wheel U, before described. The said shaft $A^9$ is journaled in bearing-boxes $a^9$, (see Fig. 15,) hung on rods $b^9$ from the boiler extension $a^{19}$, and it is braced preferably, by the rods $c^9$, (see Fig. 16,) connected to the shaft or axle R, the rod $d^9$, connected by the coupling $a^{20}$ and nut $a^{21}$ in a pivoted and adjustable manner to the cross-head $e^9$ at the forward ends of the rods $c^9$ and the cross-head $f^9$ connected to the forward end of the rod $d^9$ in a swiveled manner, and fixedly connected to the boxes $a^9$ and the bottom of the generator, as illustrated, for a purpose presently described. At the ends the shaft $A^9$ is provided with cranks $D^9$ for the connection of pitmen $E^9$ on the piston-rods $F^9$ of the engine $G^9$, which may be and preferably is of the ordinary construction and need not therefore be further described in detail. The shaft $A^9$ is also provided with eccentrics $H^9$, which are arranged in straps $I^9$, having the slotted cams $J^9$, in which are adjustably arranged the ends of pitmen $K^9$, which are connected to the valve-stems $L^9$ of the engine, as shown. The engine-valves, which may be of the ordinary balanced slide type, are arranged in chests $M^9$ and are connected to the stems $L^9$, so as to be reciprocated by the gearing described when the engine is in motion. The lever $n^7$, to which the piston of pump $A^8$ is connected, is connected in turn to the cross-head of one of the piston-rods $F^9$, and therefore it will be seen that the pump will be operated by the engine when the same is in motion.

Steam is conveyed from the generator R' to the valve-chests $M^9$ through the pipe $N^9$, which is arranged in the generator and has a plurality of minute apertures for the entry of steam, and the pipe $P^9$, which communicates with one end of the pipe $N^9$ and the valve-chests, as shown, and contains the throttle-valve $R^9$. (Better shown in Fig. 12.) The stem $S^9$ of said throttle-valve is provided at its upper end with the strap $T^9$ of the shape shown, in which is loosely arranged the gudgeons $U^9$ of a crank-shaft $V^9$, which is provided at its forward end with a crank $W^9$, connected by the link $Y^9$, (see Fig. 2,) lever $Z^9$, and rod $l'$ with the lower section $k'$ of the sectional sleeve on the post I, whereby it will be seen that when the female section of the handle P is turned upon the male section the throttle-valve will be opened and the engine started, and when said section is turned in the opposite direction the said throttle-valve will be closed and the engine stopped.

$p^9$ (see Figs. 2 and 9) indicates a rock-shaft journaled in suitable bearings in rear of the valve-gear of the engine. This rock-shaft $p^9$ has arms $q^9$, which are connected with the pitmen $K^9$ of the valve-gear by links $r^9$, and said rock-shaft also has an arm $s^9$ at one end, (see Fig. 9,) which is connected by the rod $t^9$ with the crank-arm $u^9$ of a shaft $v^9$, which has another arm $w^9$ connected to the lower end of the rod Q, whereby it will be seen that when the handle P is raised in a vertical plane the pitmen K⁹, which are shown in the forward ends of the slotted cams J⁹, will be shifted to the rear ends of said cams, and in consequence the engine will be reversed to back the vehicle.

N⁶ indicates a pipe which connects with the carbonic-acid-gas cartridge Q' and has a cock P⁶ and a check-valve R⁶ to permit the carbonic-acid gas to pass from the cartridge Q', but check its return.

S⁶ indicates a pipe which has cocks T⁶ T¹⁰ and a suitable pressure-reducing valve U⁶ and is connected to the pipe P⁹, which leads to the valve-chests of the steam-engine below the throttle-valve R⁹, and V⁶ indicates an oil-receptacle which is interposed between the pipes N⁶ S⁶, so as to enable the carbonic-acid gas to carry lubricant into the valve-chests and piston-cylinders of the engine.

W⁶ indicates a pipe which connects the pipe N⁶ and the pipe S⁶ and is so arranged that by closing the cock T⁶ carbonic-acid gas may be conveyed to the pipe P⁹ without passing through the receptacle. The stem of the cock or valve T¹⁰ passes up through the operator's seat M', as shown in Fig. 2, so as to enable him to readily cut off or turn on the carbonic-acid gas as desired.

X⁶ indicates an oil-receptacle which is connected by a pipe Y⁶ to the pipe S⁶ in advance of the valve T¹⁰ and is provided with a plunger designed to be operated by the foot of the operator, so as to force lubricant into the pipe P⁹ to be conveyed by the steam into the interior parts of the engine to insure the easy running of the same.

A¹⁰ and B¹⁰ indicate a steam-gage and an air-pressure gage, respectively, the former being connected by a pipe C¹⁰ with the pipe e⁵, leading from the steam-generator R', and the latter being connected by a pipe D¹⁰ with the pipe which connects the gasolene-tank N' and the air-compressing pump N³, as illustrated in Fig. 3.

E¹⁰ (see Figs. 4, 10, and 11) indicates a wheel which is fixed on the section $f^2$ of the axle or shaft R and is provided with a peripheral groove in which is seated a wood annulus F¹⁰. This wood annulus F¹⁰ is designed to be engaged by the brake-band G¹⁰, which surrounds the wheel E¹⁰ and has its ends lapped and adjustably connected together, as better illustrated in Fig. 11. One end portion of the brake-band G¹⁰ is connected by an arm H¹⁰ with a head I¹⁰, fixed on the rear cross-bar C of the main frame, and the other end portion is connected by an arm J¹⁰ with a bell-crank lever K¹⁰, fulcrumed on the head I¹⁰. This lever K¹⁰ has one of its arms connected by a rod L¹⁰ with a pedal-lever M¹⁰, fulcrumed on the footboard r, whereby it will be seen that when said lever is depressed the brake-band will be tightened on the wheel E¹⁰ to brake the vehicle, and when the said lever is released the brake-band and the parts connected therewith will, by reason of the resiliency of the band, resume their normal positions, so as to permit the wheel E¹⁰ to freely turn.

In practice the water-tank P' and the tank N' are filled with water and gasolene, respectively, and the cartridge Q' is charged with carbonic-acid gas from a suitable source of supply. The air-pump N³ is then operated, through the medium of the handle W¹¹, to charge the tank N' with the desired pressure of air, after which the valve $u^7$ is opened to permit water to flow from the tank P' to the steam-generator, and the valves $d^7$ and $g^7$ are opened to permit the hydrocarbon to flow to the burners T' and torch U', respectively, and the said burners and torch are ignited by a match or the like introduced through the door W¹². When a sufficient pressure of steam is generated, the operator is apprised of the fact by the gage A¹⁰, and in order to start the vehicle he has simply to turn the handle P so as to open the throttle-valve and permit the steam to pass from the generator R' to the engine. After the vehicle is started it may be steered by moving the handle P in a horizontal plane and may be stopped by turning said handle in the direction opposite to that first mentioned and applying the brake through the medium of the pedal-lever M¹⁰. While the vehicle is in motion, if it is necessary to suddenly reverse its direction of motion the same may be accomplished by simply raising the handle P in a vertical plane, as illustrated by the dotted lines in Fig. 1.

The engine for driving the vehicle is adapted to be actuated by steam, by steam and carbonic-acid gas, or by carbonic-acid gas alone—that is to say, carbonic-acid gas and just enough steam in the generator to maintain the piston-cylinders and valve-chests, all of which are arranged in the extension $a^{19}$ of the generator, in a heated state, so as to expand the carbonic-acid gas when it enters the same. When it is desired to actuate the engine by steam alone, the valve P⁶ of the pipe N⁶ is closed, and the valve T¹⁰ in said pipe N⁶ is also closed, so as to cut off the carbonic-acid-gas cartridge from the engine. When it is desired to use steam and carbonic-acid gas together, the valves P⁶ and T¹⁰ of the pipe N⁶ are opened, as is also the throttle-valve R⁹, so as to permit the commingled steam and gas to enter the valve-chests of the engine through the pipe P⁹. With the engine being actuated by steam and carbonic-acid gas in conjunction it is necessary when the engine is to be stopped to close not only the throttle-valve R⁹, but also the valve T¹⁰. This may be readily done, inasmuch as the operator is enabled by reason of the convenient arrangement of parts to close the throttle-valve R⁹ with one hand through the medium of the handle P and the valve T¹⁰ with the other hand. When it is desired to actuate the engine with carbonic-acid gas and enough steam in the generator to heat the piston-cylinders, throttle-valve $R^9$ is entirely closed and the valve $T^{10}$ is opened. With the engine being actuated by the expanded carbonic-acid gas alone it is simply necessary in order to stop it to close the valve $T^{10}$. While the engine is adapted to be actuated by carbonic-acid gas alone in the manner described, I contemplate using such gas simply as an auxiliary to the steam in climbing sharp grades, where additional power is necessary to drive the engine and maintain the normal speed of the vehicle. The carbonic-acid gas is also adapted for use in traveling upon a level when it is desired to increase the speed of the vehicle above the normal.

While I have specifically described the engine for propelling the vehicle, I desire it to be understood that I do not confine myself to the same, as any suitable motor or propelling mechanism may be employed for the purpose, and the handle possessing the capabilities described may be readily connected to the propulsion, controlling, or reversing devices irrespective of the character of motor or propelling or reversing devices employed. I would also have it understood that while I have entered into a detail description of the construction and relative arrangement of the parts of my improved vehicle in order to impart a full, clear, and exact understanding of the same I do not desire to be understood as confining myself to such specific construction and arrangement, as such changes and modifications may be made in practice as fairly fall within the scope of my invention.

The rear drive-shaft R of the vehicle is connected with the crank-shaft $A^9$ of the engine by the stay $A^{20}$, before specifically described, the purpose of which is to hold the steam generator and engine steady and at the same time, in virtue of the swivel connection of rod $d^9$ to cross-head $f^9$, prevent sudden downward movements of the wheels, as when one or both pass into ruts or other obstructions, from being transmitted to the steam generator and engine. The stay $A^{20}$ is also so constructed and the generator $R'$ and the gasolene and water tanks $N'$ $P'$ are so connected to the vehicle-body, as before described, as to permit of the chain $C^9$, between the sprocket-wheels $B^9$ U, being tightened when the same becomes slack from usage and wear, it being simply necessary when the chain $C^9$ is to be tightened to loosen the clamp-straps $a^{16}$, which connect the tanks $N'$ $P'$ with the body, and also loosen the bolts which connect the flanges $a^{17}$ of the generator to the yoke $a^{18}$ and pass through slots in said flanges, and then after loosening the nut $a^{21}$ turn the rod $d^9$ out of the threaded section of the coupling $a^{20}$ until the chain is sufficiently tight, when the nut $a^{21}$ is tightened, as are also the clamp-straps $a^{16}$ and the bolts which connect the flanges $a^{17}$ of the generator to the yoke $a^{18}$, when the vehicle is ready for use. In this way it will be readily observed that slack of the sprocket-chain $C^9$ may be taken up and the chain rendered taut, so as to prevent lost motion without in any way impairing any of the parts, which is an important advantage.

Having thus described my invention, what I claim is—

1. In a motor-vehicle, the combination with a propelling mechanism, a device for controlling the same and a steering wheel or wheels; of a handle arranged to oscillate and rock, a connection between said handle and the steering wheel or wheels whereby the vehicle is steered when the handle is oscillated and a connection between said handle and the propulsion-controlling device whereby the propelling mechanism is started or stopped when the handle is rocked; said latter connection comprising two reciprocatory sections connected in a swiveled manner whereby the connection with the propulsion-controlling device is prevented from interfering with the oscillatory movements of the handle, substantially as specified.

2. In a motor-vehicle, the combination with a propelling mechanism, a device for controlling the same, a device for reversing the direction of movement of the propelling mechanism and a steering wheel or wheels; of a handle arranged to oscillate or swing in two different planes and also arranged to rock, a connection between said handle and the steering wheel or wheels whereby the vehicle will be steered when the handle is oscillated or swung in one plane, a connection between the handle and the device for reversing the direction of movement of the propelling mechanism whereby such mechanism will be reversed when the handle is oscillated or swung in the other plane, and a connection between the handle and the propulsion-controlling device whereby the propelling mechanism will be started or stopped when the handle is rocked, substantially as specified.

3. In a motor-vehicle, the combination of a propelling mechanism, a device for controlling the same, a steering wheel, or wheels, a rock-shaft connected with the steering wheel or wheels, a reciprocating sleeve surrounding the rock-shaft and connected with the propulsion-controlling device, and a handle connected with the rock-shaft and adapted to be oscillated to rock the same and also having a connection with the sleeve and adapted to be rocked or turned to move the same and operate the propulsion-controlling device, substantially as specified.

4. In a motor-vehicle, the combination of a propelling mechanism, a device for controlling the same, a device for reversing the direction of movement of the propelling mechanism, a steering wheel, or wheels, a rock-shaft connected with the steering wheel or wheels, a reciprocating sleeve surrounding the rock-shaft and connected with the propulsion-controlling device, a handle pivotally connected with the rock-shaft, and movable in one plane with the rock-shaft and in another plane on said shaft and having a connection with the sleeve and adapted to be rocked or turned to move the same, and a connection between the handle and the device for reversing the propulsion-controlling device whereby said device will be operated when the handle is moved on the rock-shaft, substantially as specified.

5. In a motor-vehicle, the combination of a propelling mechanism, a device for controlling the same, a steering wheel, or wheels, an upright, tubular post, a rock-shaft loosely arranged in said post and connected with the steering wheel, or wheels, a reciprocatory sleeve loosely mounted on the post and connected with the propulsion-controlling device, and a handle connected with the rock-shaft and adapted to be oscillated to rock the same and also having a connection with the sleeve and adapted to be rocked or turned to move the same and operate the propulsion-controlling device, substantially as specified.

6. In a motor-vehicle, the combination of a propelling mechanism, a device for controlling the same, a device for reversing the direction of movement of the propelling mechanism, a steering wheel, or wheels, an upright tubular post, a rock-shaft loosely arranged in said post and connected with the steering wheel, or wheels, a sleeve loosely mounted on the post and connected with the propulsion-controlling device, a handle pivotally connected with the rock-shaft and adapted to be moved in a horizontal plane to rock the same and also adapted to be moved in a vertical plane on the shaft and having a connection with the sleeve and adapted to be rocked or turned to move the same and operate the propulsion-controlling device, and a connection between the handle at an intermediate point of its length and the device for reversing the propelling mechanism, whereby, when said handle is moved in a vertical plane, the propelling mechanism will be reversed, substantially as specified.

7. In a motor-vehicle, the combination of a propelling mechanism, a device for controlling the same, a steering wheel, or wheels, a rock-shaft connected with the steering wheel, or wheels, a reciprocatory sleeve surrounding the rock-shaft and comprising a lower section connected with the propulsion-controlling device and an upper section so connected with the lower section that it is adapted to move lengthwise with the lower section and to turn on the rock-shaft independent of the said lower section, and a handle connected with the rock-shaft and adapted to be oscillated to rock the same and also having a connection with the upper section of the sleeve and adapted to be rocked or turned to move the same, substantially as specified.

8. In a motor-vehicle, the combination of a propelling mechanism, a device for controlling the same, a device for reversing the propelling mechanism, a steering wheel, or wheels, a rock-shaft connected with the steering wheel, or wheels, a reciprocatory sleeve surrounding the rock-shaft and comprising a lower section connected with the propulsion-controlling device and an upper section so connected with the lower section that it is adapted to move lengthwise with the lower section and to turn on the rock-shaft independent of the same, a handle comprising a male section pivotally connected with the rock-shaft so as to permit of it being swung in a vertical plane and a female section loosely receiving the male section and adapted to be turned thereon and having a connection with the upper section of the reciprocatory sleeve, and a rod connected with the device for reversing the propelling mechanism and having a sleeve loosely receiving the female section of the handle, substantially as specified.

9. In a motor-vehicle, the combination of a propelling mechanism, a device for controlling the same, a steering wheel or wheels, a handle having an oscillatory movement and comprising a male section and a female section; said female section being adapted to rock or turn on the male section, a connection between the male section of the handle and the steering wheel or wheels for steering the vehicle when the handle is oscillated, and a connection between the female section of said handle and the propulsion-controlling device for stopping and starting the propelling mechanism when the female-handle-section is rocked; said latter connection comprising a lower section connected with the propulsion-controlling device and an upper section connected with the female handle-section and so connected with the lower section that it is adapted to move lengthwise with the lower section and to turn independent of the said lower section, substantially as specified.

10. In a motor-vehicle, the combination of a main frame, a spring-supported body on said frame, a tubular post mounted on said body the axletree or frame connected to the main frame, the independent wheel-journals pivotally connected to the ends of the axletree or frame and having the rearwardly-extending arms, wheels on said journals, a rod connecting the arms of the journals, the arm loosely connected to said rod adjacent to the middle thereof, a steering rock-shaft arranged in the tubular post on the spring-supported body, a handle connected to the upper end of the rock-shaft and having a portion bearing on the tubular post, and a connection between said steering-shaft and the arm comprising the "diamond" having the four pivotally-connected members, and the rod M, depending from the diamond and fixed to the arm said "diamond" being adapted to compensate for the vertical movements of the spring-supported body so that the connection between the steering-shaft and the arm will not be effected thereby, substantially as specified.

11. In a motor-vehicle, a horizontal tank for gasolene or other hydrocarbon, and a pipe arranged below the tank and connected at its ends to opposite ends of said tank and pitched downwardly to its middle and having an outlet at said middle, substantially as specified.

12. The combination of a gasolene-tank divided into two compartments by a transverse partition and having such compartments connected by an aperture in the partition, a hydrocarbon-burner, and a conduit connecting one compartment of the tank and said burner, substantially as specified.

13. In a motor-vehicle, the combination of a steam-generator, a horizontal tank for gasolene or other hydrocarbon, one or more hydrocarbon-burners arranged in the fire-box of the steam-generator, a pipe arranged below the gasolene-tank and connected at its ends to opposite ends of said tank and pitched downwardly to its middle, and a pipe connecting the middle of the aforesaid pipe and the burners, substantially as specified.

14. In a motor-vehicle, a horizontal tank for gasolene or other hydrocarbon divided into compartments by a partition and having such compartments connected by an aperture in the partition, one or more hydrocarbon-burners, and a pipe connected with the hydrocarbon burner or burners and also connected with the gasolene-tank at opposite sides of the partition therein, substantially as specified.

15. In a motor-vehicle, the combination of a propelling-engine, a steam-generator, a carbonic-acid-gas tank or cartridge, and valve-controlled connections between the steam-generator and the engine and between the carbonic-acid-gas tank or cartridge and said engine, whereby the engine may be actuated by steam alone or by steam and carbonic-acid gas; the steam serving to assist in actuating the engine and also as a means for heating the cylinder, or cylinders, of the engine to expand the carbonic-acid gas when it enters the same, substantially as specified.

16. In a motor-vehicle, the combination of a propelling-engine, a steam-generator, a carbonic-acid-gas tank or cartridge, and valve-controlled connections between the steam-generator and the engine and between the carbonic-acid-gas tank or cartridge and said engine, whereby the engine may be actuated by steam alone, by steam and carbonic-acid gas, or by carbonic-acid gas alone with steam as a medium for heating the piston cylinder or cylinders of the engine, substantially as specified.

17. In a motor-vehicle, the combination with a propelling mechanism, a device for controlling the same, a device for reversing the direction of movement of the propelling mechanism, and a steering wheel or wheels; of a handle arranged to oscillate or swing in two different planes and also arranged to rock on its axis, a connection between said handle and the steering wheel or wheels whereby the vehicle will be steered when the handle is oscillated or swung in one plane, a connection between the handle and the device for reversing the direction of movement of the propelling mechanism whereby such mechanism will be reversed when the handle is oscillated or swung in the other plane, and a connection between said handle and the propulsion-controlling device whereby the propelling mechanism is started or stopped when the handle is rocked; said latter connection comprising two reciprocatory sections connected in a swiveled manner whereby the connection with the propulsion-controlling device is prevented from interfering with the oscillatory movements of the handle, substantially as specified.

18. In a motor-vehicle, the combination of a body, a shaft carrying a traveling wheel or wheels and also carrying a gear-wheel, a crank or other drive-shaft provided with a gear-wheel, a belt connecting the gear-wheels on the said shafts, a steam-generator adjustably connected with the body whereby it is adapted to be adjusted on the body and with respect to the shaft carrying the traveling wheel or wheels, an engine carried by the generator and connected with the drive-shaft, a water-tank adjustably fixed on the body and connected and movable with the generator, and a fuel-tank also adjustably fixed on the body and connected and movable with the generator, substantially as specified.

19. In a motor-vehicle, the combination of a main frame; a spring-supported body on the frame; a vertically-arranged steering-shaft carried by the body; a steering wheel or wheels carried by the main frame; means for controlling the steering wheel or wheels, comprising a rod normally substantially in alinement with the steering-shaft; and a "diamond" consisting of members or bars pivotally connected at their ends arranged in a vertical plane and connected by its upper joint to the lower end of the steering-shaft and by its lower joint to the upper end of the rod of the controlling means of the steering wheel or wheels.

20. In a motor-vehicle, the combination of a main frame, a spring-supported body on the frame; a vertically-arranged steering-shaft carried by the body; a steering wheel or wheels carried by the main frame; means for controlling the steering wheel or wheels, comprising a rod normally substantially in alinement with the steering-shaft; four bars or links pivoted together at their ends to form a "diamond" and arranged in a vertical plane between the steering-shaft and the rod; a link having right-angled pivotal connections with the lower end of the steering-shaft and the upper pivotal joint of the "diamond;" and another link connecting the lower joint of the "diamond" and the upper end of the rod.

21. In a motor-vehicle, the combination with a main frame and a body supported thereon, of an axletree carrying steering-wheels at its ends and having central horizontal bearing connections with the main frame; means for controlling the steering wheel or wheels, comprising a rod normally substantially in alinement with the steering-shaft; and a "diamond" consisting of members or bars pivotally connected at their ends arranged in a vertical plane and connected by its upper joint to the lower end of the steering-shaft and by its lower joint to the upper end of the rod of the controlling means of the steering wheel or wheels.

22. In a motor-vehicle, the combination with a main frame and a body supported thereon, of an axletree carrying steering-wheels at its ends; braces connected to the axletree near its ends and extending rearwardly to the central line of the main frame, said rearward ends of the braces being provided with a horizontal bearing connection with the main frame, and a horizontal bearing connection between the central part of the axletree and the forward part of the main frame, the axis of which is in line with the axis of the bearing at the rear end of the braces; means for controlling the steering wheel or wheels, comprising a rod normally substantially in alinement with the steering-shaft; four bars or links pivoted together at their ends to form a "diamond" and arranged in a vertical plane between the steering-shaft and the rod; a link having right-angled pivotal connections with the lower end of the steering-shaft and the upper pivotal joint of the "diamond;" and another similar link connecting the lower joint of the diamond and the upper end of the rod.

In testimony whereof I affix my signature in presence of two witnesses.

CHARLES DAVID PAIGE GIBSON.

Witnesses:
  H. KOPIDE,
  EMIL AGERLSTON.